US008655835B2

(12) United States Patent
Nakamura

(10) Patent No.: US 8,655,835 B2
(45) Date of Patent: Feb. 18, 2014

(54) INFORMATION GENERATING DEVICE WHERE INFORMATION IS DISTRIBUTED AMONG NODE DEVICES, INFORMATION GENERATING METHOD WHERE INFORMATION IS DISTRIBUTED AMONG NODE DEVICES, AND COMPUTER READABLE RECORDING MEDIUM FOR GENERATING INFORMATION WHICH IS DISTRIBUTED AMONG NODE DEVICES

(75) Inventor: Kazuhiro Nakamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 109 days.

(21) Appl. No.: 13/238,703

(22) Filed: Sep. 21, 2011

(65) Prior Publication Data

US 2012/0078841 A1 Mar. 29, 2012

(30) Foreign Application Priority Data

Sep. 29, 2010 (JP) .................................. 2010-219804

(51) Int. Cl.
*G06F 7/00* (2006.01)
*G06F 17/00* (2006.01)
(52) U.S. Cl.
USPC ......................................................... 707/618
(58) Field of Classification Search
None
See application file for complete search history.

(56) References Cited

U.S. PATENT DOCUMENTS

| 5,794,232 | A  | * | 8/1998  | Mahlum et al. ........................ 1/1 |
| 6,970,840 | B1 | * | 11/2005 | Yu et al. ....................... 705/27.1 |
| 2007/0283043 | A1 |   | 12/2007 | Kiyohara et al. |
| 2009/0037445 | A1 |   | 2/2009  | Ushiyama |

FOREIGN PATENT DOCUMENTS

| JP | A-2006-197400 | 7/2006 |
| JP | A-2007-280303 | 10/2007 |

* cited by examiner

*Primary Examiner* — Uyen Le
(74) *Attorney, Agent, or Firm* — Oliff PLC

(57) ABSTRACT

An information generating device in an information communication system in which contents and catalog information including its attribute information are distributed in node devices, includes: a first storage unit storing first catalog information, the catalog information including link information associating the plurality of attribute information with each other; a acquisition unit acquiring, in response to updating the content of the attribute information, the updated attribute information; a generation unit generating the link information for updating the first catalog information on the basis of the attribute information acquired by the first acquisition unit, and the first catalog information stored in the first storage unit, and generate second catalog information including the generated link information and the updated attribute information; a second storing unit storing the second catalog information; and an updating unit updating the first catalog information on the basis of the second catalog information for each given period.

8 Claims, 9 Drawing Sheets

INFORMATION GENERATING DEVICE WHERE INFORMATION IS DISTRIBUTED AMONG NODE DEVICES, INFORMATION GENERATING METHOD WHERE INFORMATION IS DISTRIBUTED AMONG NODE DEVICES, AND COMPUTER READABLE RECORDING MEDIUM FOR GENERATING INFORMATION WHICH IS DISTRIBUTED AMONG NODE DEVICES

CROSS-REFERENCE TO RELATED APPLICATION

This application is based upon and claims the benefit of priority of Japanese Patent Application No. 2010-219804 filed on Sep. 29, 2010, the contents of which are incorporated herein by reference in its entirety.

BACKGROUND

The disclosure relates to a data structure and a search technology for searching attribute information on a content.

Up to now, there has been known a distributed content saving system in which a plurality of contents is distributed and saved in a plurality of node devices that can communicate with each other through a network. In the distributed content saving system of this type, each of the node devices uses catalog information in which attribute information on the content is described. Each of the node devices can search a desired content, and acquire the content from another node device or a content management server. The attribute information includes a content name, an open start time, an open end time, and a keyword of the content. The catalog information is generated by the content management server, and is delivered to each node device. In the distributed content saving system, when the attribute information on the content is updated, or a new content is added, the catalog information is updated by the content management server. The catalog information is delivered to each node device.

Incidentally, when the number of available contents in the distributed content saving system is increased, the amount of data of the catalog information is also increased. A related method in which the catalog information divided into a plurality of pieces is distributed and stored by the plurality of node devices is known.

SUMMARY

However, when the content management server updates the catalog information, there is a need to reflect the attribute information of the updated content on the catalog information. It is assumed that the catalog information is made up of plural pieces of attribute information, and link information that associates those attribute information with each other. In this case, when the attribute information is updated, the update of the link information is also required. In order that the catalog information is distributed and saved in the plurality of node devices, the content management server has a need to deliver the updated attribute information and link information. For that reason, when the attribute information is frequently updated, a communication load of the network is increased.

An aspect of the disclosure has been made in view of the above problems. The aspect of the disclosure aims at providing an information generating device, an information generating method, and an information generating program, which can reduce the communication load of the network attributable to delivery of the catalog information, in a system in which the catalog information is distributed and saved in a plurality of node devices.

The aspect of the disclosure provides the following arrangements:

An information generating device in an information communication system in which a plurality of contents and catalog information including a plurality of attribute information of the contents are distributed and saved in a plurality of node devices connected to a network, the information generating device comprising:

a first storage unit configured to store first catalog information that is distributed and saved in the plurality of node devices, the catalog information including link information associating the plurality of attribute information with each other under a given rule;

a first acquisition unit configured to acquire, in response to updating the content of the attribute information included in the catalog information is updated, the updated attribute information;

a generation unit configured to generate the link information to be used for updating the first catalog information on the basis of the attribute information acquired by the first acquisition unit, and the first catalog information stored in the first storage unit, and generate second catalog information including the generated link information and the updated attribute information;

a second storing unit configured to store the second catalog information generated by the generation unit; and an updating unit configured to update the first catalog information stored in the first storage unit on the basis of the second catalog information stored in the second storage unit for each given period.

An information generating method in an information communication system in which a plurality of contents and catalog information including a plurality of attribute information of the contents are distributed and saved in a plurality of node devices connected to a network, the information generating method comprising:

storing first catalog information that is distributed and saved in the plurality of node devices, the catalog information including link information associating the plurality of attribute information with each other under a given rule;

acquiring, in response to updating the content of the attribute information included in the catalog information, the updated attribute information;

generating the link information to be used for updating the first catalog information on the basis of the acquired attribute information and the stored first catalog information;

generating second catalog information including the generated link information and the updated attribute information;

storing the second catalog information generated in the generating in a second storage unit; and updating the stored first catalog information on the basis of the stored second catalog information for each given period.

A non-transitory computer readable storage medium, the storage medium storing an information generating program executable by the computer included in an information generating device in an information communication system in which a plurality of contents and catalog information including a plurality of attribute information of the contents are distributed and saved in a plurality of node devices connected to a network, the storage medium including instruction of:

storing first catalog information that is distributed and saved in the plurality of node devices, the catalog information including link information associating the plurality of attribute information with each other under a given rule;

acquiring, if the content of the attribute information included in the catalog information is updated, the updated attribute information;

generating the link information to be used for updating the first catalog information on the basis of the acquired attribute information and the stored first catalog information;

generating second catalog information including the generated link information and the updated attribute information;

storing the second catalog information generated in the generating in a second storage unit; and updating the stored first catalog information on the basis of the stored second catalog information for each given period.

DESCRIPTION OF EXEMPLARY EMBODIMENTS

Hereinafter, an exemplary embodiment will be described with reference to the accompanying drawings. The embodiment described below is described with employing a distributed content saving system.

Figure 1:
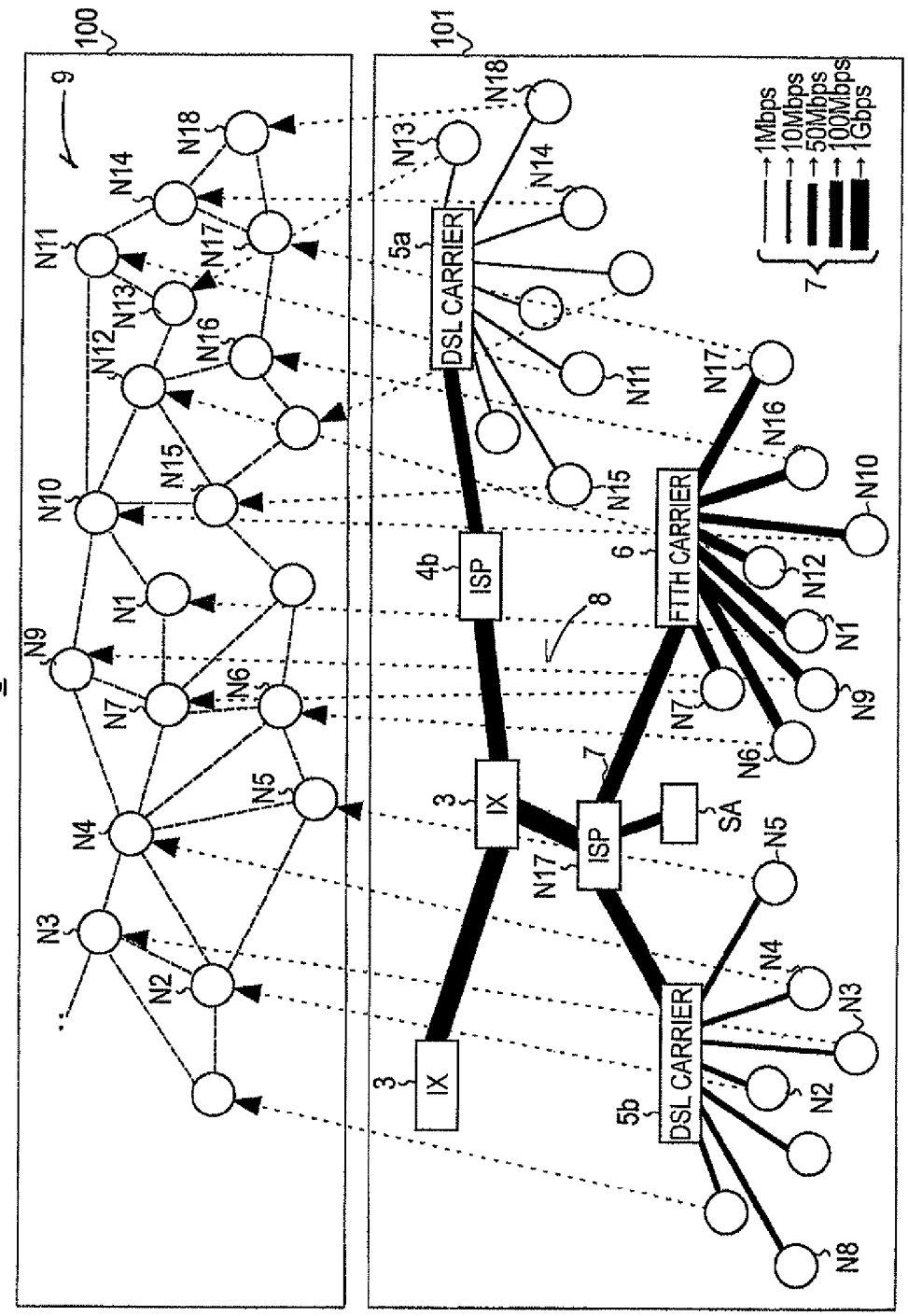
FIG. 1 is a diagram illustrating an example of a connection mode of respective node devices in a distributed content saving system according to one embodiment.

1. Outline Configuration and Operation Outline of the Distributed Content Saving System First, a description will be given of a configuration and an operation outline of the distributed content saving system according to this embodiment. FIG. 1 includes a specific configuration diagram 101 of the distributed content saving system S, and a conceptual configuration diagram 100. As illustrated in the specific configuration diagram 101 of the distributed content saving system S, the distributed content saving system S is configured by a large number of node devices Nn (n is any one of 1, 2, 3 . . . ).

As illustrated in the specific configuration diagram 101 of FIG. 1, the distributed content saving system S is configured by connecting the plurality of node devices Nn to each other through an internet. As illustrated in a lower frame 101 of FIG. 1, a network 8 such as an internet is constructed by an internet exchange (IX) 3, internet service providers (ISP) 4a, 4b, digital subscriber line (DSL) carrier devices 5a, 5b, a fiber to the home (FTTH) carrier device 6, and a communication line 7. The network 8 is a real-world communication network. Routers for transferring data packets are appropriately inserted into the network 8 in the example of FIG. 1, but omitted in FIG. 1. As the communication line 7, for example, a telephone line or an optical cable is used.

The network 8 is connected with the plurality of node devices Nn (n is any one of 1, 2, 3, . . . ). In the following description, the node device is called "node". A unique serial number and an internet protocol (IP) address are allocated to each node Nn. In this embodiment, the distributed content saving system S configures a peer to peer network system made up of any plural nodes Nn among the nodes Nn as illustrated in the conceptual configuration diagram 100 of FIG. 1.

An overlay network 9 illustrated in the conceptual configuration diagram 100 configures a virtual link formed with the existing network 8. The overlay network 9 which is a logical network is realized by a specific algorithm, for example, an algorithm using the DHT. A node ID that is identification information represented by given digits is allocated to each node Nn connected to the distributed content saving system S.

Each node Nn holds a routing table using the DHT. The routing table specifies a transfer destination of various messages on the distributed content saving system S. More specifically, plural node information including the node IDs, the IP addresses, and the port number of the nodes Nn which are appropriately apart from each other within an ID space are registered in the routing table. One node Nn stores the node information on the minimum nodes Nn as the routing table. Various messages are transferred between the respective nodes Nn to acquire the node information on the node Nn in which no node information is stored.

In the distributed content saving system S, replicas of various content data different in substance are distributed and saved in the plurality of nodes Nn in a given file format. In the following description, the content data is called "content". The replicas can be used between the respective nodes Nn. An original of each content is saved in the center server SA. The node Nn in which the replica of the content is saved is called "content saving node". In the following description, the content of each original and the replica are called "content" without specific distinction.

Information such as a content ID which is identification information unique to each of content names and contents is added to the above content. The ID space of the content ID matches, for example, the ID space of the node ID. The locations of the contents distributed and saved are stored in the nodes Nn that manage (store) the locations of the contents as the held node information. In the following description, the node Nn that manages (stores) the location of the content is called "root node". The held node information includes a set of the node information of the node Nn that save the content, and the content ID of the content. This root node is determined, for example, as a node Nn having the node ID closest to the content ID. The node ID closest to the content ID is, for example, the node ID in which the higher-order digits of the ID most match each other.

In each node Nn, the attribute information such as the content name and the content ID of each content is described in the catalog information. The catalog information is created by the center server SA on a page information basis. The page information configures the catalog information having a tree structure. The page information corresponds to a node of the tree structure in the catalog information. A structure and substance of the catalog information will be described in detail later. Each node Nn has an assigned range of the page information to be held. The assigned range is determined, for example, on the basis of the node ID of each node Nn. Each node Nn acquires the page information within the range assigned to the node Nn per se from the center server SA or another node Nn. In this way, the catalog information is distributed and saved in the plurality of nodes Nn on the page information unit. Each node Nn acquires necessary page information from the center server SA or another node Nn if there is no necessary page information in searching the attribute information of the content. The content acquiring method using the DHT routing has been known by US Patent Application Publication No. 2007/0283043 A1, which is incorporated herein by reference, and therefore its detail description will be omitted.

2. Basic Structure and Substance of the Catalog Information

Subsequently, a description will be given of a base structure and substance of the catalog information with reference to FIG. 2. The catalog information is provided for managing the attribute information of the contents as a list. The attribute information is stored in a record. The catalog information enables the content to be specified by a search key. Enabling the content to be specified means that the record of the content can be searched. The search of the record is conducted in the center server SA, and also conducted in the node Nn. The catalog information used in the distributed content saving system S has a structure of a search tree in order to prevent the falsification of the record and to effectively search the record.

Figure 2:
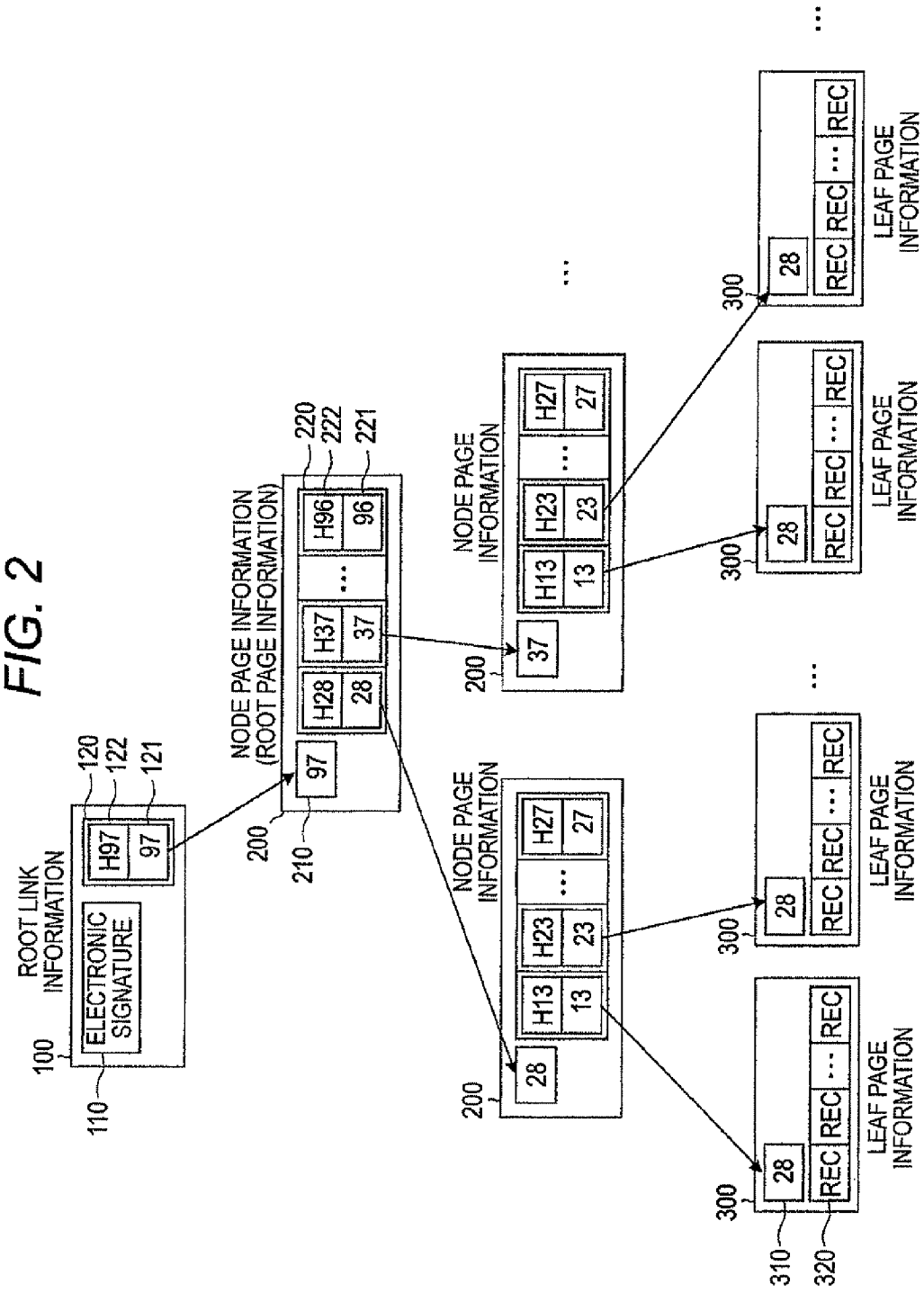
FIG. 2 is a diagram illustrating an example of a basic structure of catalog information according to the embodiment.

As illustrated in FIG. 2, the catalog information is configured so that root page information located on a root of the tree structure to leaf page information located at a leaf are associated with each page information. The page information directly associated with each other has a relationship between parents and children. It is assumed that page information Y is associated with certain page information X. That is, it is assumed that the page information X and the page information Y have the relationship between parents and children. If the page information X is shorter in distance from the root page information than the page information Y, the page information X becomes the page information of the parent located at the parent when viewed from the page information Y. The page information Y becomes the page information of the child located at the child when viewed from the page information X. In this description, the distance from the root page information means a length extending from a position of the root to a node in question, corresponding to the number of links in the tree structure. In other words, the distance from the root page information corresponds to the number of page information including the page information in question, passing from the root page information to the page information in question according to the association. In the following description, the page information of the parent is called "parent page information", and the page information of the child is called "child page information".

The association of the parent page information with the child page information is indicated by the link information. The link information is information stored in the parent page information, and refers to the child page information. The link information includes the page No. of the child page information, and a message digest for checking the falsification of the child page information.

The page No. is a serial number uniquely allocated to the page information. Page Nos. are allocated to the page information in its creation order, for example, in the order from No. 1. The page information indicated by the link information means the page information to which the page No. included in the link information is allocated. When some page information is updated, new page No. is allocated to that page information. For example, the page information is saved as a file. In this case, the file name of the page information includes allocated page No. As a result, the file of the page information can be specified from the page No.

The message digest is information for checking the falsification of the record stored in the child page information indicated by the link information or the child page information indicated by the link information. The message digest is a value obtained by hashing an object to be falsification checked through a common hash function. The catalog information further includes root link information (reference numeral 100). The root link information is stored with the link information with the root link information (reference numeral 120). The link information includes the page No. of the root link information (reference numeral 121) and the message digest (reference numeral 122). The root link information is stored with an electronic signature (reference numeral 110). The electronic signature is information for checking the falsification of the root link information. The electronic signature includes information such as a signature value and certification information.

The page information is roughly classified into node page information (reference numeral 200) and leaf page information (reference numeral 300). The node page information is associated with one or more pieces of the child page information. The node page information is stored with page No. (reference numeral 210), and the link information with the child page information (reference numeral 220). The page No. is allocated to the node page information in which the page No. is stored. The node page information can be stored with plural pieces of link information. The maximum number of link information that can be stored in one piece of node page information matches the order of the catalog information as the tree structure. This order means the maximum number of children that can be provided in one parent. That is, the order corresponds to a value of n of an n-ary search tree.

The leaf page information is page information located at a leaf in the search tree as described above. That is, the leaf page information has no child page information. The leaf page information is stored with page No. (reference numeral 310) and record (reference numeral 320). The page No. is allocated to the leaf page information including this page No. One or plural records are stored in the leaf page information. One or plural pieces of attribute information of the content is set in one record. For example, a content ID, publication start date and publication end date of the content, a content name, and a keyword are set in the record.

The tree structure of the catalog information has an order. When the content ID is entered as the search key, search is conducted according to an algorithm corresponding to the tree structure of the catalog information, thereby making it possible to specify the leaf page information including the record corresponding to the content ID. As information corresponding to the order of the tree structure, an index is allocated to each of page information. For simplification of description of the index, as an example, it is assumed that the content ID and the index are each configured by quaternary number of four digits.

"****" is allocated to the root page information as the index. "*" indicates that a value of that digit is not determined. There is four pieces of node page information located at the child of the root page information at a maximum. As the index, any one of "0*", "1*", "2*", and "3*" is allocated to each of the child page information. Which index is allocated to which child page information is specified in the parent page information. For example, each of the link information to be stored in the root page information may be stored in an array structure so that the index of the page information indicated by the link information can be specified according to a storage position thereof. In this case, for example, the link information indicative of the child page information in which the index is "0*" is stored at a position corresponding to 0, and the link information indicative of the child page information in which the index is "1*" is stored at a position corresponding to 1. For example, the link information and the index of the page information indicated by that link information may be stored in association with each other in the node page information.

Any one of "00", "01", "02", and "03" is allocated to the node page information located at the child of the node page information in which the index is "0*". The page information located at the child of the node page information in which the index is "01" is, for example, the leaf page information. In this case, any one of "010*", "011*", "012*", and "013*" is allocated to the leaf page information. The respective records having the index of "0120", "0121", "0122", and "0123" are stored in the leaf page information in which the index is "012*. That is, the attribute information of the content in which the content ID is "0120", "0121", "0122", or "0123" is stored therein. For example, when each record is stored in the array structure, the index can be specified by a storage position thereof. For example, the records and the indexes of the records may be stored in association with each other in the leaf page information.

The center server SA may have a function other than the content ID, for example, a function of searching the record with the content name and the publication start date as the search keys. In this case, hint information may be stored in each of the node page information. The hint information functions as a key for searching the record with the search key. In searching the record, the hint information and the search key are subjected to arithmetic processing according to a given algorithm. It is determined whether there is a possibility that the record searched by the search key is stored in the page information located at the child of the node page information in which the hint information is stored, or a lower position, or not. If the center server SA determines that there is the possibility that the record searched by the search key is stored therein, the center server SA searches the record referring to the page information located at the child of the node page information, or lower. On the other hand, if the center server SA determines that there is no possibility that the record searched by the search key is stored therein, there is no need to refer to the page information located at the child of the node page information, or lower. As a result, it can be determined whether the record searched by the search key is stored in the page information located at the child of the node page information, or lower, or not, without false-negative. The false-negative means a property that true positive is determined as negative in error.

Subsequently, a description will be given of a reason why the falsification of the attribute information of the content can be prevented. Whether the child page information is falsified, or not, is checked according to the link information with the child page information, which is stored in the parent page information. That is, since the message digest of the child page information is included in the link information, the falsification is checked according to the message digest. In this way, whether the child page information in the leaf page information to the root page information is falsified, or not, is checked according to the root link information. Whether the root page information is falsified, or not, is checked according to the root link information. Whether the root link information is falsified, or not, is checked according to the electronic signature stored in the root link information per se. For that reason, the authenticity of the page information in the root page information to the leaf page information can be ensured. As a result, the falsification of the entire catalog information can be prevented.

The above structure of the catalog information described with reference to FIG. 2 is exemplary. Any structure of the catalog information is applicable if the structure can search the record of the content. When the structure of the catalog information is of the tree structure, for example, the record may be stored in not only the leaf page information but also the node page information. The order of the tree structure, that is, the maximum number of the link information that can be stored in one node page information is arbitrary. The type of tree may be a balanced tree such as a B– tree, B+ tree, or a red-back tree, or a simple n-ary search tree with no balance. The type of tree may be also a trie.

For example, the catalog information may be of a structure of a linked list. The catalog information having the structure of the linked list is configured by, for example, the root link information and plural pieces of page information. Each of the page information is stored with one or more records, and one piece of link information. The page information may be stored with the page No. and the index of the page information. In this case, the index is the content ID in the attribute information stored in the record. Each of the page information is associated with each other, for example, in an increasing order of a value of the index by the link information. The link information means page information next to the page information that stores the link information. The page information next to given page information is page information to which the smallest index next to the index of given page information is allocated. The link information is stored with the page No. and the message digest of the next page information. The root link information means the page information having the smallest index value among the plural pieces of page information. The root link information is stored with the electronic signature for checking the falsification of the page No. of the page information, the message digest, and the root link information.

Any structure of the catalog information can employ the following modified examples. For example, the maximum number of records that can be stored in one piece of page information may be one or plural. The page No. allocated to the page information has no need to be stored in that page information per se. In the link information, the information associating the page information with each other is not limited to only the page No. The electronic signature may not be included in the root link information. The message digest may not be included in the root link information and the link information. The root link information may not be included in the catalog information.

3. Structure of the Catalog Information Including a Stable Tree Portion and an Update Tree Portion Subsequently, a description will be given of a structure of the catalog information including a stable tree portion and an update tree portion with reference to FIG. 3. The center server SA needs to update the catalog information when the attribute information of the content is changed, or the content is added or deleted. When the catalog information is updated, for example, the leaf page information that stores the record of the content to be changed, added, or deleted is first updated. In this embodiment, new leaf page information in which the record of the content in question is updated, added, or deleted is created with respect to the original leaf page information. The original leaf page information and the new page information are different from each other in at least part of the substance of the stored record. Accordingly, in order to check the falsification of the new leaf page information, there is a need to recalculate the message digest in the link information stored in the node page located at the parent of the leaf page information. Because the page No. of the leaf page information becomes also new, there is a need to also update the page No. in the link information stored in the node page. Accordingly, there is a need to create new node page information in which the page No. and the message digest of the new leaf page information are stored with respect to the node page located at the parent of the leaf page information. For the same reason, there is a need to create new node page information with respect to the node page located at the parent of the new node page information. In this way, the new page information of the leaf page information to the root page information is created. Then, there is a need to create new root link information in which the page No. and the message digest corresponding to the new root page information are stored.

In this way, when one record is updated, added, or deleted, plural pieces of root link information and root link information are recreated. The root link information used for search is switched from the old root link information to the new root link information, to thereby update the catalog information. Accordingly, when the record is frequently updated, added, or deleted, a load of updating the catalog information by the center server SA becomes high. When the center server SA delivers the updated page information to the node Nn for saving the page information every time the catalog information is updated, the communication load of the network becomes high. When the catalog information is updated, each node Nn cannot search the record without acquiring the new page information. For that reason, when the catalog information is frequently updated, the messages for acquiring the page information by the node Nn are frequently issued. For that reason, the communication load of the network becomes high.

Under the circumstances, in this embodiment, a stable tree portion and an update tree portion are provided as the tree structure of the catalog information. The stable tree is not frequently updated as a tree configured by the page information. The update tree is updated every time the record is updated, added, or deleted as a tree configured by the page information. The catalog information of the stable tree portion is called "stable tree catalog information". The catalog information of the update tree portion is called "update tree catalog information".

Figure 3:
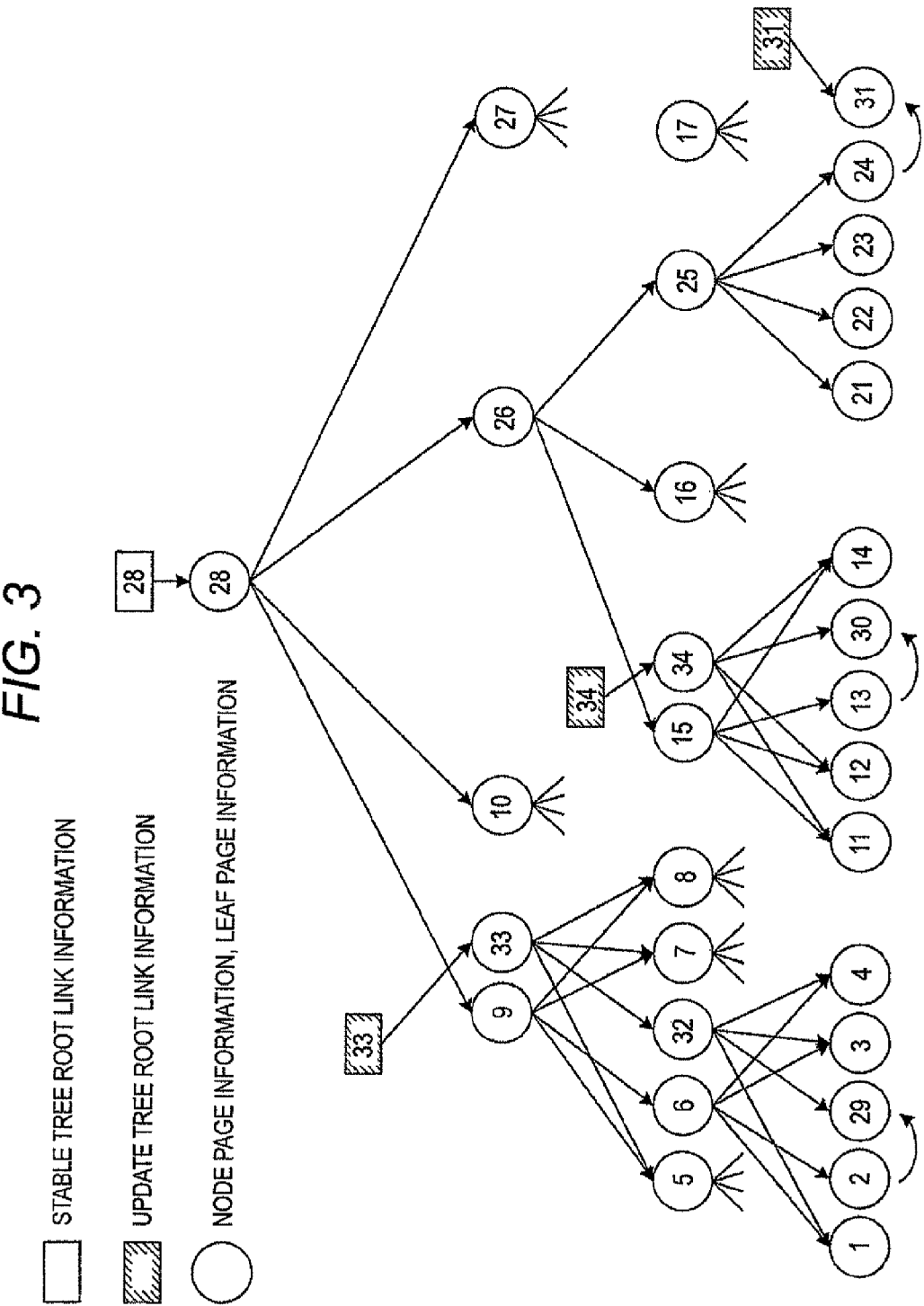
FIG. 3 is a diagram illustrating an example of a structure of the catalog information having a stable tree portion and update tree portions.

Referring to FIG. 3, the page information is indicated by circles. Number mentioned in each circle is page No. of the page information indicated by that circle. Referring to FIG. 3, the root link information is indicated by squares. Number mentioned in each square is page No. of the page information indicated by the root link information indicated by that square.

The page information in which page No. is 28 is the root page information of the stable tree. The root link information indicative of the root page information of page No. 28 is the root link information of the stable tree. Only one root link information of the stable tree basically exits. In the stable catalog information, as the child page information of the node page information of page No. 28, there are the node page information of page Nos. 9, 10, 26, and 27. As the child page information of page No. 9, there are the node page information of page Nos. 5, 6, 7, and 8. As the child page information of page No. 26, there are the node page information of page Nos. 15, 16, 25, and 17. As the child page information of page No. 6, there are the leaf page information of page Nos. 1, 2, 3 and 4. As the child page information of page No. 25, there are the leaf page information of page Nos. 21, 22, 23 and 24.

One or plural root link information of the update tree may exist. The root link information indicative of the page information of page No. 31, the root link information indicative of the page information of page No. 33, and the root link information indicative of the page information of page No. 34 are the respective root link information of the update trees. Each of the root link information of the update tree is associated with the index of the page information indicated by the root link information. For example, the root link information of the update tree is saved as a file. In this case, the file name of the root link information of the update tree includes the index of the page information indicated by the root link information. As a result, the file of the root link information of the update tree can be specified from the index.

In the update tree page information, a tree is formed for each of the root link information. The update tree can be regarded as a partial tree including the updated page information. As the child page information of page No. 33, there is the node page information of page Nos. 5, 32, 7, and 8. As the child page information of page No. 32, there is the leaf page information of page Nos. 1, 29, 3, and 4. As the child page information of page No. 34, there is the leaf page information of page Nos. 11, 12, 30, and 14. In this way, there is a case in which the partial page information serves as both components of the stable tree catalog information and the update tree catalog information. The catalog information illustrated in FIG. 1 is an example in which only the stable tree catalog information exists, and no update tree catalog information exists.

The leaf page information of page No. 29 is leaf page information having the substance of the stored record updated from the leaf page information of page No. 2. Accordingly, the index of the leaf page information of page No. 29 matches the index of the leaf page information of page No. 2. The leaf page information of page No. 30 is leaf page information having the substance of the stored record updated from the leaf page information of page No. 13. The leaf page information of page No. 31 is leaf page information having the substance of the stored record updated from the leaf page information of page No. 24. The node page information of page No. 32 is node page information having the substance of the stored record updated from the node page information of page No. 6. The node page information of page No. 33 is node page information having the substance of the stored record updated from the node page information of page No. 9. The node page information of page No. 34 is node page information having the substance of the stored record updated from the node page information of page No. 15.

For example, it is assumed that there is a need to update the record stored in the leaf page information of page No. 24. In this case, the center server SA creates the leaf page information of page No. 31 that stores the updated record on the basis of the updated record and the leaf page information of page No. 24 that is the leaf page information of the stable tree. The center server SA creates the root link information of the update tree indicative of the leaf page information of page No. 31 newly created. The leaf page information of page Nos. 29 and 30, and the link information indicative of the leaf page information thereof are created in the same manner. Each of the page information is created in the order of page No. The node page information of page Nos. 32, 33, and 34, the root link information indicative of the page information of page No. 33, and the root link information indicative of the page information of page No. 34 are created in an update tree merging process which will be described later. The above root link information is appropriately deleted when the update tree merging process has been completed.

4. Update and Delivery of the Catalog Information

Subsequently, a description will be given of the operation outline of the distributed content saving system S when the catalog information is updated and delivered with reference to FIG. 4. The center server SA conducts an update tree merging process at given timing. The update tree merging process reflects the page information configuring the update tree catalog information to the stable tree catalog information to update the stable tree catalog information. As a given timing, for example, when an operator operates the center server SA to order the update tree merging process, the update tree merging process may be executed. The update tree merging process may be executed every time a given time is elapsed. The update tree merging process may be executed when a given number of page information configuring the update tree catalog information is created. The update tree merging process may be executed when the number of updating, adding, or deleting the record arrives at a given number. When the update tree merging process is executed every time the given time is elapsed, the given time may be changed on the basis of a given condition. That is, an execution interval of the update tree merging process may be dynamically changed. For example, when the content is populated with urgency, the operator inputs the record corresponding to the content as well as information indicative of urgency to the center server SA. When the center server SA receives the information indicative of urgency, the center server SA sets the execution interval of the update tree merging process to be shorter than a normal one. Alternatively, the update tree merging process may be executed immediately after the content has been populated. Populating the content means that the content is saved in at least any one node Nn, and the saved content can be acquired by each node Nn.

The center server SA creates the page information configuring the update tree catalog information necessary for updating the stable tree catalog information. More specifically, the center server SA creates each of the node page information of the update tree from the leaf page information to the root page information, which has been created by updating, adding, or deleting the record. As a result, the center server SA creates the page information of the update tree in which the link information for associating each of the leaf page information of the created update tree with each of the page information of the stable tree is stored.

Figure 4:
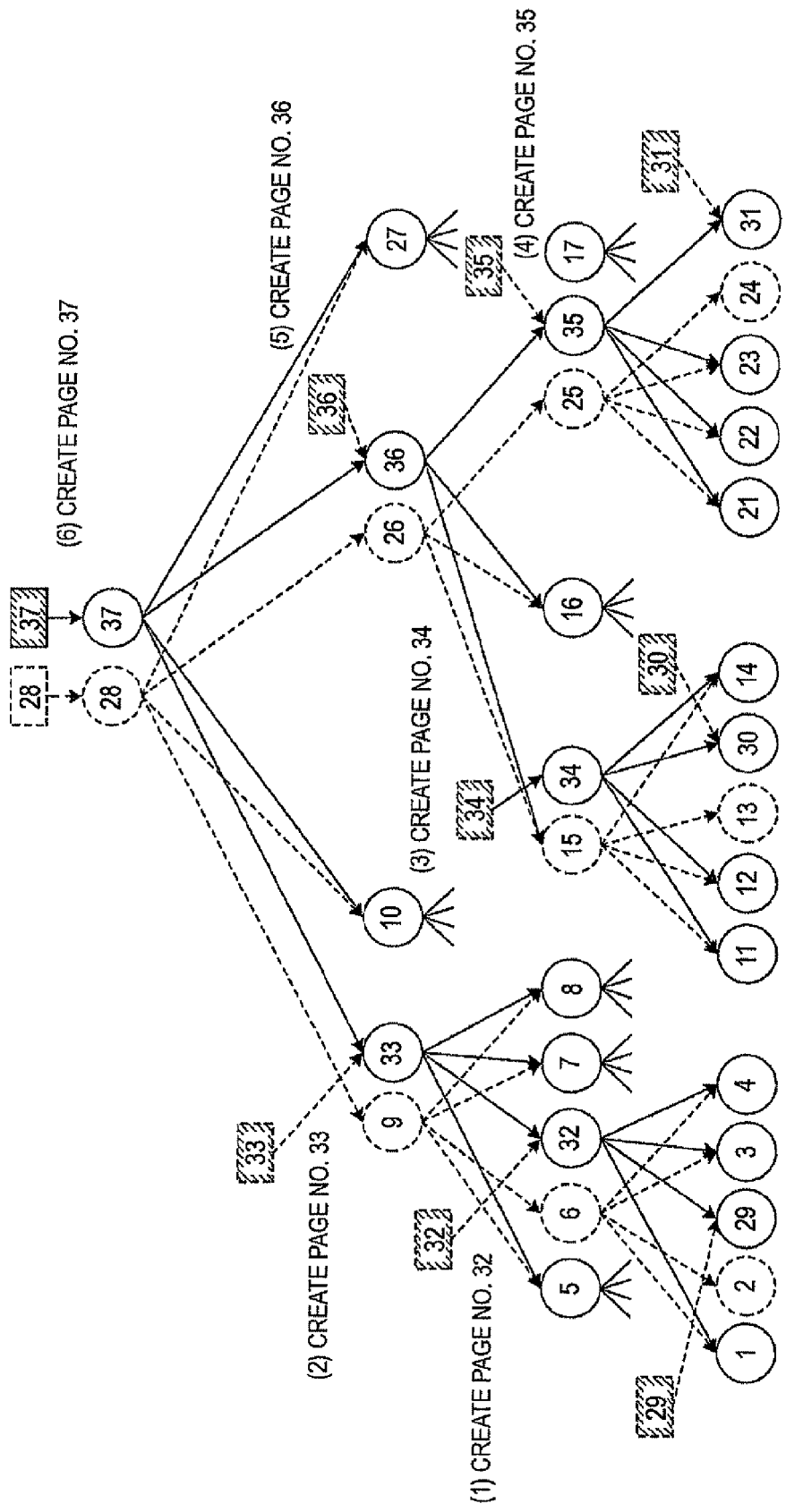
FIG. 4 is a diagram illustrating an example of an appearance in which the catalog information is updated by the update tree merging processing.

For example, as illustrated in FIG. 4, in the catalog information, the leaf page information of page Nos. 29, 30, and 31, and the respective root link information indicative of the leaf page information are created by updating, adding, or deleting the record. Thereafter, it is assumed that the update tree merging process is started.

As the leaf page information of the update tree which matches the leaf page information and the index of page No. 2, there is the leaf page information of page No. 29. In this case, the leaf page information located at the child of page No. 6 is changed. For that reason, there is a need to update the node page information of page No. 6. Under the circumstances, the center server SA creates the node page information of the update tree which matches the node page information and the index of page No. 6 (FIG. 4(1)). More specifically, the center server SA creates the node page information of page No. 32 in which the link information indicative of the leaf page information of page No. 2 among the link information stored in the node page information of page No, 6 is changed to the link information indicative of the leaf page information of page No. 29. The center server SA creates the root link information of the update tree indicative of the node page information of page No. 32.

As a result, the node page information of page No. 6 located at the child of the node page information of page No. 9 is changed. Under the circumstance, the center server SA creates the node page information of the update tree which matches the node page information and the index of page No. 9 (FIG. 4(2)). More specifically, the center server SA creates the node page information of page No. 33 in which the link information indicative of the leaf page information of page No. 6 among the link information stored in the node page information of page No. 9 is changed to the link information indicative of the leaf page information of page No. 32. The center server SA creates the root link information of the update tree indicative of the node page information of page No. 33.

As the leaf page information of the update tree which matches the leaf page information and the index of page No. 13, there is the leaf page information of page No. 30. In this case, the leaf page information located at the child of page No. 15 is changed. Under the circumstances, the center server SA creates the node page information of page No. 34 and the root link information indicative of the page information, which matches the node page information and the index of page No. 15 (FIG. 4(3)). Likewise, the center server SA creates the node page information of page No. 35 and the root link information indicative of the page information, which matches the node page information and the index of page No. 25 (FIG. 4(4)). The center server SA creates the node page information of page No. 36 and the root link information indicative of the page information, which matches the node page information and the index of page No. 26 (FIG. 4(5)). Further, the center server SA creates the node page information of page No. 37 and the root link information indicative of the page information, which matches the node page information and the index of page No. 28 (FIG. 4(6)).

When the node page information of page No. 37, which is the root page information of the update tree, is created, all of the page information of the necessary update tree is created. Under the circumstances, the center server SA delivers the page information created by updating, adding, or deleting the record, and the page information created by the update tree merging process to each node Nn. In this situation, the center server SA delivers each of the page information to the node Nn for saving the page information. Each node Nn acquires the page information of the update tree within an assigned range by delivering the page information from the center server SA.

The node Nn for saving each of the page information is determined on the basis of the index of the page information. For example, the node Nn having the node ID closest to a value of the index of the page information serves as the node Nn for saving the page information. The node ID closest to the index is, for example, the node ID in which the higher-order digits of the ID most match each other. For example, if the index is "0123", the node Nn in which the node ID matches "0123", or the node ID is closest to "0123" saves the page information. For example, if the index is "01", the node Nn in which the higher two higher-order digits of the node ID are "01" saves the page information. For example, if the index is "**", all of the nodes Nn save the page information. For example, the node Nn may save the page information in which given higher-order digits of the node ID match given higher-order digits of the index. For example, the node Nn in which the node ID is "0123" may save all of the page information in which the three higher-order digits of the index are "012", or may save all of the page information in which the two higher-order digits of the index are "01". In this way, the index of the page information is information indicative of the node Nn that saves the page information.

For example, the center server SA may conduct delivery through the overlay multicast disclosed in US2009037445A1 which is incorporated herein by reference. In this case, the center server SA transmits, to any node Nn, a update tree page transmission message including, for example, the page information to be delivered, the index of the page information to be delivered, a mask value, and "push type" which is a transmission type. The index of the page information to be delivered corresponds to a target node ID disclosed in US2009037445A1. The mask value corresponds to an ID mask disclosed in US2009037445A1. The transmission type is information indicative of the transmission mode of the page information included in the page transmission message, and set to "push type" or "pull type". When the page information is transmitted by the initiative of the center server SA, the transmission type is set to "push type". When the page information is transmitted on the basis of a request from the node Nn, the transmission type is set to "pull type". The node Nn that saves the page information is determined on the basis of the index of the page information to be delivered, and the mask value set in the center server SA. In this case, the update tree page transmission message exemplifies first instruction information for instructing the node Nn that saves the page information to save the page information.

With transfer of the update tree page transmission message, the page information is delivered to the node Nn that saves the page information. The processing contents of each node Nn when delivering the page information are known in US2009037445A1, and therefore their detailed description will be omitted. The center server SA may select the node Nn that transmits the update tree page transmission message at random, or may transmit the update tree page transmission message to a specific node Nn. The center server SA may transmit the update tree page transmission message to the plurality of nodes Nn. When the center server SA transmits the update tree page transmission message to a specific node Nn, the specific node Nn is called "supporter". The supporter is the node Nn that conducts the delivery in order to reduce the delivery load of the center server SA.

The center server SA may transmit the created page information directly to the node Nn that saves the page information. In this case, the center server SA stores the node ID, the IP address, and the port No. of each node Nn in advance. The center server SA determines the node Nn that is a destination of the page information to be delivered on the basis of the index of the page information to be delivered, and the stored node ID.

Upon completion of the delivery of the page information, each of the created page information is saved in one or more nodes Nn. For that reason, after the root link information of the stable tree which will be described later is switched, each of the page information configuring the updated stable tree catalog information is distributed and saved in the plurality of nodes Nn.

Upon completion of the delivery of the page information, the center server SA stores the update tree root link information indicative of the node page information of page No. 37 as the root link information of a new stable tree after waiting for a given time, to thereby switch the root link information of the stable tree (FIG. 4(7)). In this way, the center server SA updates the stable tree catalog information with the use of the update tree catalog information. With this operation, only the page information indicated by solid lines is used for searching the record.

As part of switching the root link information of the stable tree, when each node Nn searches the record, the center server SA instructs each node Nn to search the record with the use of the updated stable tree catalog information. More specifically, the center server SA delivers the root link information of the new stable tree to all of the nodes Nn. The delivery of all the nodes Nn may be conducted by the overlay multicast disclosed in, for example, US2009037445A1. For example, the center server SA transmits, to any node Nn, a stable tree page transmission message including the root link information of a new stable tree, the root page information of the stable tree which is the page information indicated by the root link information, "****" which is the index of this page information, the mask value set to 0, and "push type" that is the transmission type. In this case, the stable tree page transmission message exemplifies second instruction information for instructing the node Nn to update the stable tree catalog information. The center server SA may transmit the stable tree page transmission message directly to all of the nodes Nn.

Each node Nn stores the root link information included in the transmitted stable tree page transmission message as the root link information of the new stable tree. Each node Nn stores the page information included in the stable tree page transmission message in association with page No. of the page information. Subsequently, each node Nn searches the record with reference to the root link information of the new stable tree. As a result, each node Nn searches the record with the use of the updated stable tree catalog information. That is, each node uses, for searching the record, the page information created as the page information of the update tree by the center server SA, as the page information included in the updated stable tree catalog information. In other words, each node Nn uses, for searching the record, the page information created as the page information of the update tree by the center server SA, in priority to the page information configuring the stable tree catalog information before the update tree merging process of the center server SA. For example, as illustrated in FIG. 4, as the page information corresponding to the same index, the page information of page No. 9 and the page information of page No. 33 exist. In this case, the page information of new page No. 33 is used for searching the record. Each node Nn appropriately deletes the root link information and the page information which become unnecessary by switching the root link information of the stable tree. For example, the root link information and the page information indicated by broken lines in FIG. 4 are deleted. If the update tree catalog information is conducted every time a given time is elapsed, this instruction for deletion is also periodically conducted. Accordingly, each node Nn periodically receives the root link information of the new stable tree.

The reason why a load of the center server SA is reduced, and the communication load of the network is reduced by updating the catalog information described above will be described. Even if the records are updated, added, or deleted, the center server SA has no need to create each of the node page information from the leaf page information to the root page information. At this time, the center server SA may create the leaf page information of the update in question and the root link information indicative of the leaf page information. For that reason, even if the record is frequently updated, added, or deleted, the load of the center server SA is not increased. The search of the record by each node Nn is conducted with the use of the stable tree catalog information that is not basically frequently updated. For that reason, in the update tree margining process, the center server SA has no need to deliver the new page information. Until the update tree merging process has been completed, the node Nn may not transmit a message for acquiring the updated page information. For that reason, the communication load of the network is not high.

5. Configuration of the Center Server SA

Subsequently, a description will be given of the configuration and function of the center server SA with reference to FIG. 5.

Figure 5:
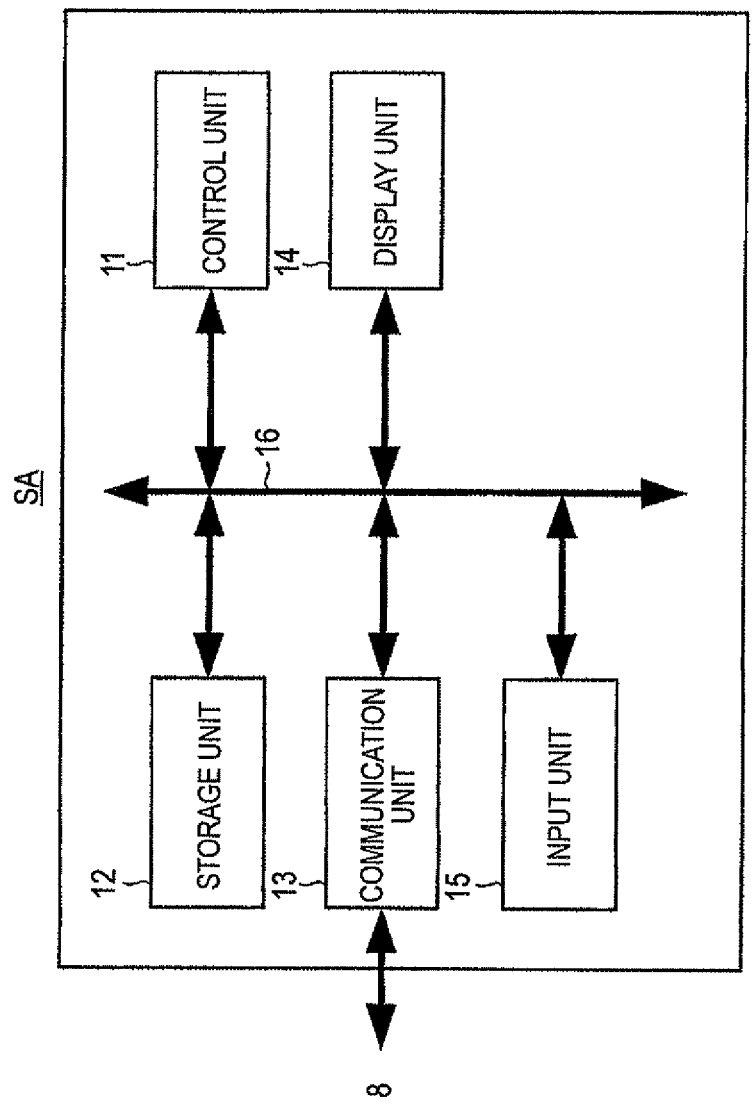
FIG. 5 is a diagram illustrating an outline configuration example of a center server.

As illustrated in FIG. 5, the center server SA includes a control unit 11 made up of a CPU having a computation function, an operation RAM, and a ROM that stores various data and a program therein. The center server SA includes a storage unit 12 made up of a hard disk (HD) for storing and saving various data and various programs. Further, the center server SA includes a communication unit 13 for conducting a communication control of information with the node Nn through the network 8. Further, the center server SA includes a display unit 14 that displays various information, such as a CRT or a liquid display. Further, the center server SA includes an input unit (for example, keyboard or mouse) 15 that that accepts an instruction from the operator, and supplies an instruction signal responsive to the instruction to the control unit 11. The control unit 11, the storage unit 12, the communication unit 13, the display unit 14, and the input unit 15 are connected to each other through a bus 16.

In the storage unit 12 are stored the node ID, the IP address, and the port No. of each node Nn. A catalog database is constructed in the storage unit 12. In the catalog database, as the catalog information, the stable tree catalog information and the update tree catalog information are registered on the root link information and page information basis.

Further, a database management program for managing the catalog database is stored in the storage unit 12. The database management program may be, for example, downloaded from a given server on the network 8. The database management program may be, for example, recorded on a recording medium such as a digital versatile disc (DVD), and read through a drive of the recording medium.

The control unit 11 allows the CPU to read and execute a program such as the database management program stored in the storage unit 12, to thereby function as a first acquisition unit, a generation unit, an update unit, a second acquisition unit, a first transmission unit, a second transmission unit, a third acquisition unit, and a search unit.

6. Operation the Distributed Content Saving System S

Subsequently, a description will be given of the operation the distributed content saving system S according to this embodiment with reference to FIGS. 6 to 9.

Figure 6:
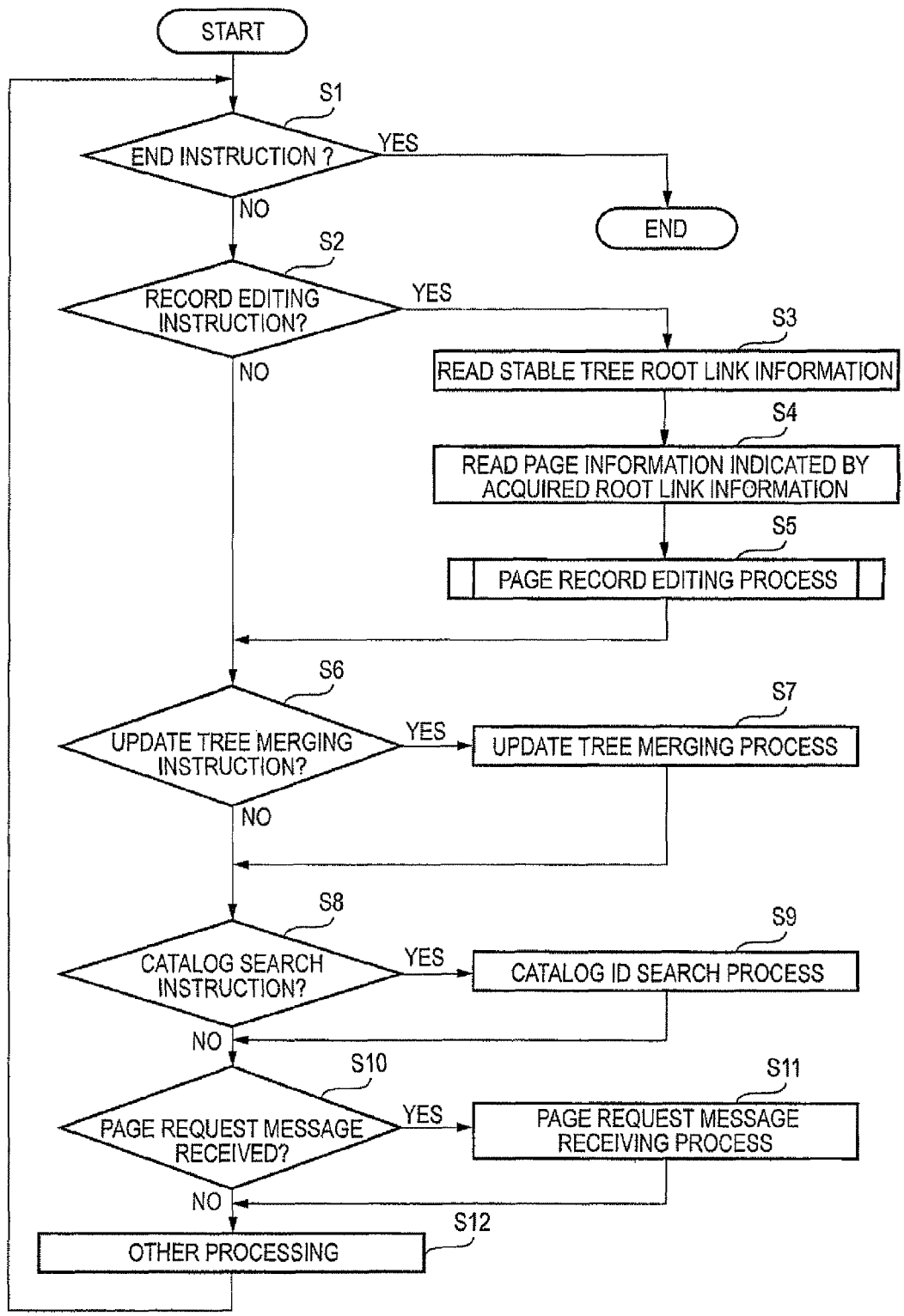
FIG. 6 is a flowchart illustrating a processing example in main processing of a control unit in the center server according to the embodiment.

Processing illustrated in FIG. 6 starts, for example, when the database management program is run. First, the control unit 11 determines whether an end instruction from the operator has been received, or not, on the basis of an input from the input unit 15 (Step S1). In this situation, if the control unit 11 determines that the end instruction has not been received (no in Step S1), the control unit 11 determines whether a record editing instruction from the operator has been received, or not, on the basis of the input from the input unit 15 (Step S2).

In this situation, if the control unit 11 determines that the record editing instruction has been received (yes in Step S2), the control unit 11 executes a record editing process. In the recording editing process, the control unit 11 creates the leaf page information of the new update tree according to the update, addition, or deletion of the record, and creates the root link information of the update tree indicative of the created leaf page information. First, the control unit 11 reads the root link information of the stable tree from the storage unit 12 (Step S3). Then, the control unit 11 reads the page information indicated by the acquired link information, that is, the root page information of the stable tree from the storage unit 12 (Step S4).

Then, the control unit 11 executes a page record editing process (Step S5). In this situation, the control unit 11 delivers, as an argument, the page information read in Step S4, and "****" that is the index of the read page information to the page record editing process, the record input from the operator through the input unit 15. The input record is called "editing record". When the record is updated, the updated attribute information is stored in the editing record. When the record is added, the attribute information of the newly added content is stored in the editing record. When the record is deleted, for example, information indicative of invalidity is stored in the editing record. For example, it is assumed that flag information indicative of whether the record is valid or invalid in stored in the record. When the record is updated or added, the flag information indicative of validity is stored in the editing record. When the record is deleted, the flag information indicative of invalidity is stored in the editing record.

If the control unit 11 determines that the editing instruction of the record has not been received (no in Step S2), or if the control unit 11 has completed the processing of Step S5, the control unit 11 determines whether a merging instruction of the update tree from the operator has been received, or not, on the basis of the input from the input unit 15 (Step S6). In this situation, if the control unit 11 determines that the merging instruction of the update tree from the operator has been received (yes in Step S6), the control unit 11 executes the update tree merging process (Step S7).

If the control unit 11 determines that the merging instruction of the update tree has not been received (no in Step S6), or if the control unit 11 has completed the processing of Step S7, the control unit 11 determines whether a search instruction of the catalog information from the operator has been received, or not, on the basis of the input from the input unit 15 (Step S8). In this situation, the control unit 11 determines that the search instruction of the catalog information from the operator has been received (yes in Step S8), the control unit 11 executes a catalog ID searching process (Step S9). In this situation, the control unit 11 delivers the content ID input from the operator as a search condition, as an argument, to the catalog ID searching process.

In the catalog ID searching process, the control unit 11 searches the record corresponding to the input content ID with the use of the stable tree catalog information. More specifically, the control unit 11 reads the root link information of the stable tree from the storage unit 12, and reads the node page information indicated by the root link information of the stable tree from the storage unit 12. The control unit 11 determines the child page information to be subsequently read among the child page information of the node page information. This determination is conducted according to the search algorithm corresponding to the structure of the search tree of the catalog information. For example, it is assumed that the index of the child page information indicated by the link information can be specified according to a storage position of the link information in the node page information. In this case, the control unit 11 specifies the storage position of the link information indicative of the child page information to be subsequently read on the basis of the input content ID, and acquires the link information from the specified storage position. For example, it is assumed that the link information and the index are stored in the node page information in association with each other. In this case, the control unit 11 compares the input content ID with the index stored in the node page information to acquire the link information to be subsequently read. The control unit 11 reads the child page information from the storage unit 12 on the basis of page No. included in the acquired link information. Hereinafter, in the same manner, the control unit 11 reads the page information of the root page information to the leaf page information on the basis of the input content ID. When the control unit 11 reads the leaf page information, the control unit 11 acquires the record corresponding to the input content ID from the leaf page information. The control unit 11 allows, for example, the attribute information stored in the acquired record to be displayed in the display unit 14 as the search result.

When the control unit 11 reads the root link information, the control unit 11 determines whether the root link information is falsified, or not, on the basis of an electronic signature stored in the root link information. When the control unit 11 reads the page information, the control unit 11 determines whether the read page information is falsified, or not, on the basis of the message digest included in the link information stored in the parent page information of the page information, or the message digest included in the root link information indicative of the page information. If the control unit 11 determines that the root link information or the page information is falsified, the control unit 11 allows, for example, a message indicating that the catalog information is falsified to be displayed in the display unit 14.

If the control unit 11 determines that the search instruction of the catalog information has not been received (no in Step S8), or if the control unit 11 has completed the processing of Step S9, the control unit 11 determines whether a stable tree page request message has been received from the node Nn, or not (Step S10). The stable tree page request message is information indicative of a request for the stable tree page information. The stable tree page request message is transmitted, for example, when the node Nn does not save the necessary page information while the node Nn is searching the record with the use of the stable tree catalog information. In this situation, the control unit 11 executes a page request message receiving process (Step S11) if the control unit 11 determines that the stable tree page request message has been received from the node Nn (yes in Step S10).

In the page request message receiving process, the control unit 11 searches the page information of the requested stable tree, and transmits the searched page information. The index of the requested page information is set for the page request message of the stable tree. This index is called "request index". If the control unit 11 receives the stable tree page request message, the control unit 11 searches the page information in the same manner as that of a catalog ID search process. The control unit 11 searches the page information with the use of not the content ID but the request index. When the control unit 11 reads the page information to which the same index as the request index is allocated, the control unit 11 transmits the read page information to the node Nn that is a source of the page request message. More specifically, the control unit 11 transmits, as the page transmission message, the stable tree page transmission message including the root link information of the stable tree stored in the storage unit 12, the read page information, the index of the read page information, and the transmission type set to "pull type".

When the node Nn receives the stable tree page transmission message from the center server SA, the node Nn stores the page information set in the page transmission message. When the root link information set in the page transmission message is newer than the root link information of the stable tree currently stored in the node Nn per se, the node Nn stores the root link information set in the page transmission message as the root link information of the new stable tree. The node Nn may transmit the page request message for the purpose of requesting the necessary page information while the record is being searched with the use of the stable tree catalog information. In this case, the node Nn restarts to search the record with the use of the page information set in the page transmission message. Since the transmission type is set to "pull type", the page transmission message is not transferred when the transmission type is "push type".

If the control unit 11 determines that the page request message has not been received from the node Nn (no in Step S10), or if the control unit 11 has completed the processing of Step S11, the control unit 11 executes other processing as required (Step S12). The control unit 11 shifts the processing to Step S1.

In Step S1, if the control unit 11 determines that the end instruction has been received from the operator (yes in Step S1), the control unit 11 completes the main processing.

Figure 7:
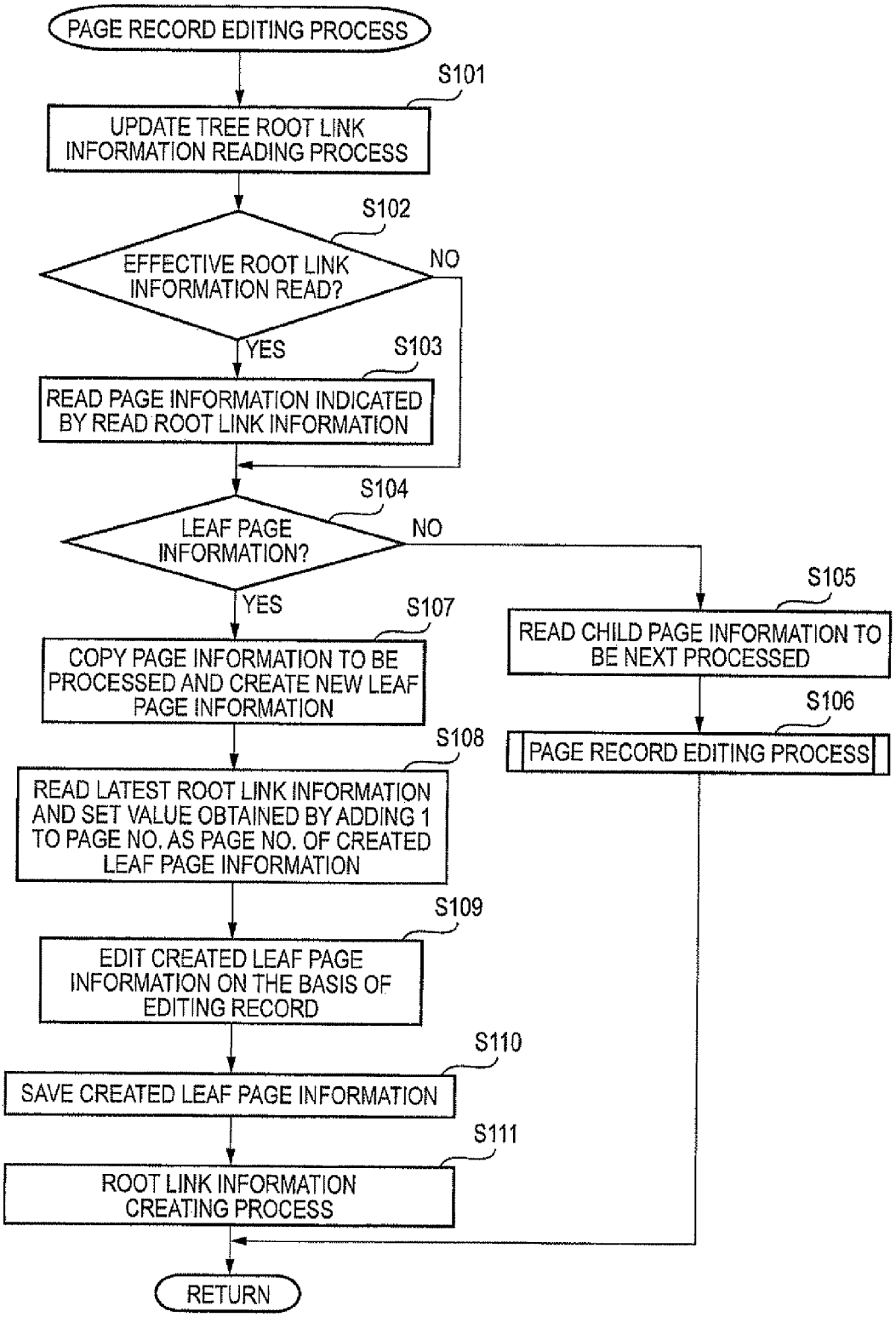
FIG. 7 is a flowchart illustrating a processing example of a page record editing process of the control unit in the center server according to the embodiment.
Figure 8:
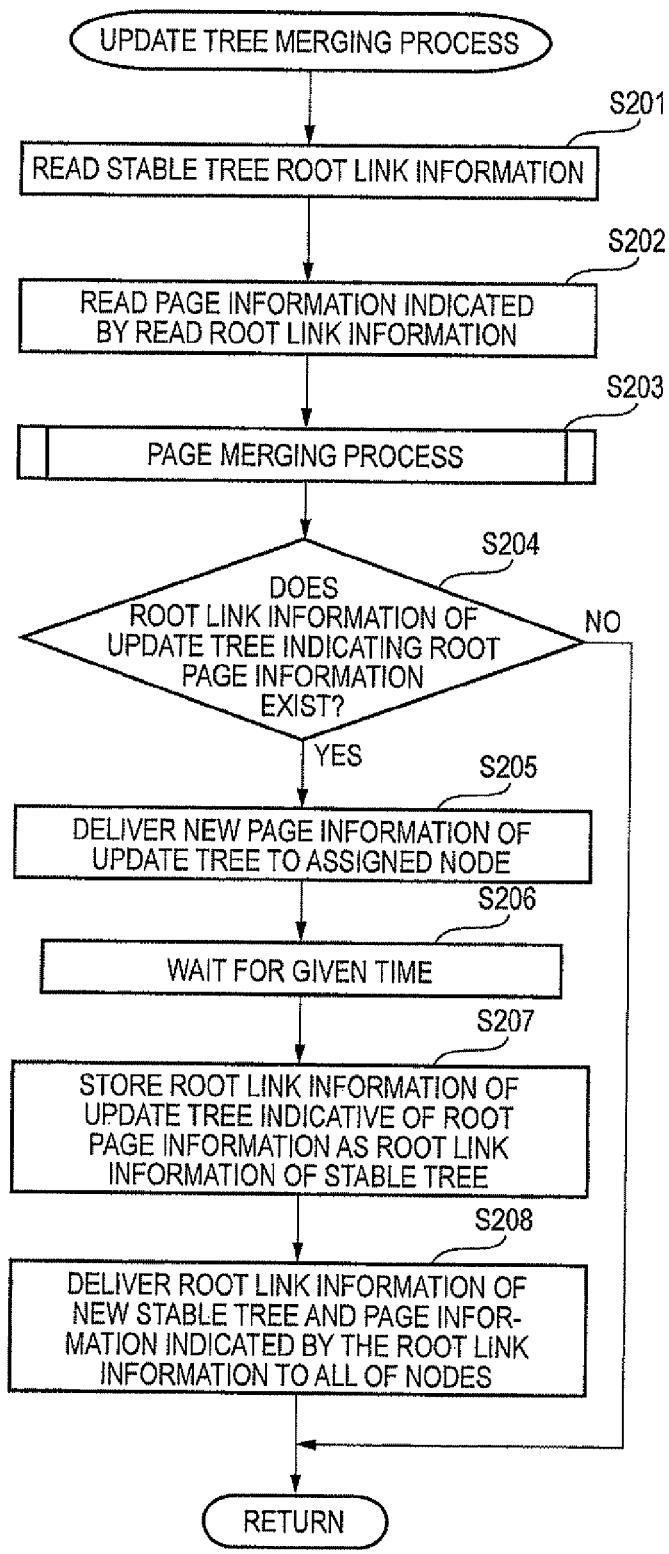
FIG. 8 is a flowchart illustrating a processing example of an update tree merging process of the control unit in the center server according to the embodiment.
Figure 9:
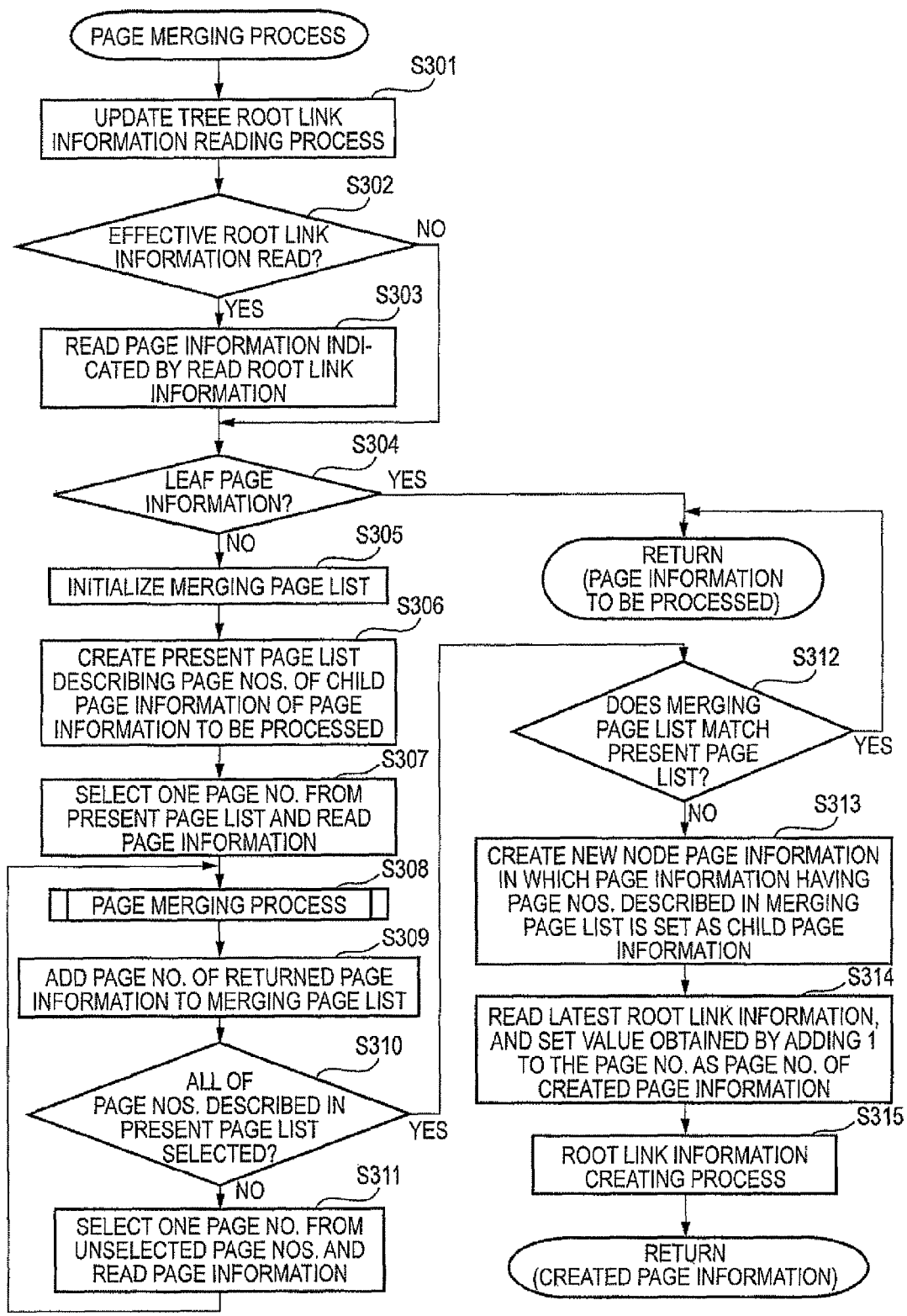
FIG. 9 is a flowchart illustrating a processing example of a page merging process of the control unit in the center server according to the embodiment.

FIG. 7 is a flowchart illustrating a processing example of a page record editing process of the control unit 11 in the center server SA according to this embodiment. First, the control unit 11 executes an update tree root link information reading process (Step S101). In the update tree root link information reading process, the root link information of the update tree which is associated with the index delivered as an argument is read from the storage unit 12. More specifically, the control unit 11 determines whether a file of the root link information of the update tree in which the index delivered as the argument is included in the file name is stored in the storage unit 12, or not. If there is no appropriate file, the root link information of the update tree which is associated with the index delivered as the argument is not stored. On the other hand, if there is an appropriate file, the control unit 11 reads the latest root link information among the root link information included in the file. Every time the page information to which a certain index is allocated needs to be updated by plural times, the page information of a new update tree is created in correspondence with the index. Every time the page information of the update tree is created, the root link information of the update tree indicative of this page information is created. For that reason, there is a plurality of root link information associated with the same index. For that reason, the control unit 11 reads the root link information indicative of the latest page information. Whether the page information is latest, or not, can be determined on the basis of page No. included in the link information stored in the root link information.

Subsequently, the control unit 11 determines whether the root link information could be read through an update tree root link information reading process, or not (Step S102). In this situation, if the control unit 11 determines that the root link information could be read (yes in Step S102), the control unit 11 reads the page information indicated by the read root link information from the storage unit 12 (Step S103).

If the control unit 11 determines that the root link information could not be read (no in Step S102), the control unit 11 shifts the processing to Step S104 with the page information delivered as the argument to be processed. On the other hand, the control unit 11 completes the processing of Step S103, the control unit 11 shifts the processing to Step S104 with the page information read in Step S103 to be processed. That is, the page information in which the latest information is stored among the page information to which the index delivered as the argument is allocated is to be processed.

In Step S104, the control unit 11 determines whether the page information to be processed is the leaf page information, or not (Step S104). For example, if one or more pieces of link information with the child page information are stored in the page information to be processed, the page information to be processed is the node page information. On the other hand, if none of the link information with the child page information is stored in the page information to be processed, the page information to be processed is the leaf page information.

In this situation, if the control unit 11 determines that the page information to be processed is not the leaf page information (no in Step S104), the control unit 11 reads, from the storage unit 12, the page information to be subsequently processed among the page information located at the child of the page information to be currently processed (Step S105). A method of determining the page information to be subsequently processed is the same as that in the catalog ID search process. However, the control unit 11 determines the page information to be subsequently processed on the basis of the content ID stored in the editing record delivered as the argument.

Subsequently, the control unit 11 executes a page record editing process through a recursive call (Step S106). In this situation, the control unit 11 delivers the editing record, the page information read in Step 105, the index of the read page information as the arguments.

In Step S104, if the control unit 11 determines that the page information to be processed is the leaf page information (yes in Step S104), the control unit 11 copies the read page information into the operation RAM to create new leaf page information (Step S107).

Subsequently, the control unit 11 adds 1 to page No. stored in the latest root link information to update page No., and sets this page No. as page No, of the created leaf page information (Step S108). The latest root link information is the finally created root link information in the root link information of the stable tree and the root link information of the update tree. The latest root link information is updated every time the root link information is created. The control unit 11 sets the updated page No. for the created leaf page information.

Then, the control unit 11 edits the created leaf page (Step S109). For example, the control unit 11 specifies the storage position of the record within the created leaf page with the content ID stored in the editing record as the index. The control unit 11 sets the editing record at the specific storage position.

Then, the control unit 11 saves the created leaf page information (Step S110). For example, the control unit 11 allows the created leaf page information to be stored as the file in the storage unit 12. In this situation, the control unit 11 allows the leaf page information to be stored with the file name including the latest page No. calculated in Step S108.

Then, the control unit 11 executes a root link information creating process (Step S111). In this case, the control unit 11 delivers the created leaf page information and the latest page No. as the arguments. In the root link information creating process, the control unit 11 creates new root link information in the operation RAM. The control unit 11 stores the latest page No. in the new root link information. The control unit 11 calculates the message digest of the page information delivered as the argument, and stores the calculated message digest in the new root link information. Then, the control unit 11 creates an electronic signature for page No. and the message digest stored in the new root link information, and stores the created electronic signature in the new root link information. Then, the control unit 11 allows the new root link information to be stored in the storage unit 12 as the file. The control unit 11 sets the file name of the new root link information as a file name including the index delivered as the argument. In this situation, if the file of the same file name has been already stored in the storage unit 12, the control unit 11 adds the new root link information to this file. the control unit 11 allows the new root link information to be stored in the storage unit 12 as the latest root link information.

When the control unit 11 completes the processing of Steps S106 and S111, the control unit 11 completes the page record editing process, and shifts to the page record editing process or the main processing of a call source. The control unit 11 first searches the leaf page information in which the editing record is stored with the use of the page information of the stable tree, through the recursive call of the page record editing process. Thereafter, if the page information of the update tree is found as the page information to be processed during searching, the control unit 11 then conducts the search with the use of the page information of the update tree.

First, the control unit 11 reads the root link information of the stable tree from the storage unit 12 (Step S201). Then, the control unit 11 reads the page information indicated by the acquired link information from the storage unit 12 (Step S202). Then, the control unit 11 executes the page merging process (Step S203). In this situation, the control unit 11 delivers, as the arguments, the page information read in Step S202, and "****" that is the index of the read page information. In the page merging process, the page information of the update tree necessary for updating the stable tree catalog information is created.

Then, the control unit 11 determines whether there is the root link information of the update tree indicative of the root page information, or not (Step S204). If there is no update, addition or deletion of the record at all, the leaf page information of the new update tree is not created. Then, even in the page merging process, the leaf page information of the new update tree is not created. In this case, there is no need to update the stable tree catalog information. The processing of Step S204 is conducted to determine this. In this case, for example, if the file in which "**" which is the index of the root page information is included in the file name is not stored in the storage unit 12 as the file of the root link information, the control unit 11 determines that there is no root link information indicative of the root page information (no in Step S204). In this case, the control unit 11** completes the update tree merging process.

On the other hand, if the file in which "**" which is the index of the root page information is included in the file name is stored in the storage unit 12, the control unit 11 determines that there is the root link information of the update tree indicative of the root page information (yes in Step S204). In this case, the control unit 11 delivers the leaf page information of the update tree created in the record editing process and the node page information of the update tree created in the page merging process to the node Nn that saves those pieces of information (Step S205). More specifically, the control unit 11** transmits the update tree page transmission message including the page information to be delivered, the index of the page information to be delivered, the mask value corresponding to the assigned range of the page information, and "push type" that is the transmission type.

Subsequently, the control unit 11 waits for a given time (Step S206). This wait is provided because after waiting until the page information of the update tree is saved in a certain number of nodes Nn, the center server SA switches the root link information of the stable tree.

Then, the control unit 11 deletes the root link information of the present stable tree stored in the storage unit 12. Then, the control unit 11 allows the root link information of the update tree indicative of the root page information to be stored in the storage unit 12 as the root link information of the new stable tree (Step S207).

Then, the control unit 11 delivers the root link information of the update tree as the root link information of the new stable tree to all of the nodes Nn (Step S208). More specifically, the control unit 11 transmits, to any node Nn, the stable tree page transmission message including the root link information of the new stable tree, the page information indicated by the root link information of the stable tree, "****" as the index, the mask value set to 0, and the transmission type set as "push type". Upon completion of the processing in Step S208, the control unit 11 completes the update tree merging process.

First, the control unit 11 executes the processing of Steps S301 to S303 in the same manner as that of Steps S101 to S103. Through those processing, the control unit 11 acquires the page information in which the latest information is stored among the page information to which the index delivered as the argument is allocated as an object to be processed. Then, the control unit 11 determines whether the page information to be processed is the leaf page information, or not (Step S304). In this case, if the control unit 11 determines that the page information to be processed is the leaf page information (yes in Step S304), the control unit 11 completes the page merging process, and shifts to the page merging process or the update tree merging process of a call source. In this situation, the control unit 11 delivers the page information to be presently processed to the call source as a return value. That is, the control unit 11 delivers the leaf page information in which the latest information is stored among the leaf page information to which the index delivered as the argument is allocated.

On the other hand, if the control unit 11 determines that the page information to be processed is not the leaf page information (no in Step S304), the control unit 11 initializes a merging page list (Step S305). The merging page list is list information that associates page Nos. of the page information which is intended to be located at the child of the page information to be processed with the indexes of the page information after the update tree merging process has been completed, and the stable tree catalog information has been updated. The control unit 11 creates, in the operation RAM, for example, the merging page list in which no page No. is described as initialization of the merging page list.

Then, the control unit 11 creates, in the operation RAM, the present page list that associates the page Nos. of the present child page information of the page information to be processed with the page Nos. of the child page information (Step S306). More specifically, the control unit 11 acquires page Nos. of the child page information from each of the link information stored in the page information to be processed. Then, the control unit 11 creates the present page list including the acquired page Nos. and the indexes of the child page information.

Then, the control unit 11 selects one of page Nos. described in the present page list, and reads the page information corresponding to the selected page No. from the storage unit 12 (Step S307).

Then, the control unit 11 executes the page merging process through the recursive call (Step S308). In this situation, the control unit 11 delivers the read page information as the argument. Then, the control unit 11 associates adds page No. of the page information delivered as the return value of the page merging process executed in the recursive call in association with the index of the page information corresponding to the selected page No. to the merging page list (Step S309).

Then, the control unit 11 determines whether all of page Nos. described in the present page list have been selected, or not (Step S310). In this situation, if the control unit 11 determines that there are unselected page Nos. among page Nos. described in the present page list (no in Step S310), the control unit 11 selects one of the unselected page Nos., and reads the page information corresponding to the selected page No. from the storage unit 12 (Step S311). Then, the control unit 11 shifts the processing to Step S308.

On the other hand, if the control unit 11 determines that all of page Nos. described in the present page list are selected (yes in Step S310), the control unit 11 determines whether the substance of the merging page list matches the substance of the present page list, or not (Step S312). If the substance of the merging page list matches the substance of the present page list, the child page information of the page information to be processed is not updated at all. For that reason, there is no need to update the page information to be processed. Under the circumstances, if the control unit 11 determines that the substance of the merging page list matches the substance of the present page list (yes in Step S312), the control unit 11 completes the page merging process. In this case, the control unit 11 delivers the page information to be presently processed to the call source as the return value.

On the other hand, if the substance of the merging page list does not match the substance of the present page list, at least one piece of page information is updated among the child page information of the page information to be processed. For that reason, there is a need to also update the page information to be processed. Under the circumstances, if the control unit 11 determines that the substance of the merging page list does not match the substance of the present page list (no in Step S312), the control unit 11 creates new page information (Step S313). More specifically, the control unit 11 creates the new page information in the operation RAM. Then, the control unit 11 creates the message digest of the child page information on the basis of the child page information in which page Nos. are described in the merging page list. Then, the control unit 11 stores the link information including page Nos. described in the merging page list and the created message digest in the new page information on the operation RAM. The control unit 11 executes those processing for each of page Nos. described in the merging page list.

Then, the control unit 11 adds 1 to page No. stored in the latest root link information stored in the storage unit 12 to update page No., and sets this page No. as page No. of the created page information (Step S314). The control unit 11 sets the updated page No. for the created page information.

Then, the control unit 11 executes a root link information creating process (Step S315). In this situation, the control unit 11 delivers the created page information and the latest page No. as the arguments. As a result, the control unit 11 creates the root link information of the update tree indicative of the created page information.

Upon completion of the processing in Step S315, the control unit 11 completes the page merging process, and shifts to the page merging process or the update tree merging process of the call source. In this situation, the control unit 11 delivers the created page information to the call source as the return value. The control unit 11 creates each of the node page information of the update tree in the leaf page information to the root page information created by updating, adding, or deleting the record through the recursive call of the page merging process.

The center server SA may conduct the search with the use of the update tree catalog information through selecting operation by the operator. With the use of the update tree catalog information, even before the stable tree catalog information is updated, the latest information can be searched.

A description will be given of processing different from the above-mentioned catalog ID searching process when the record is searched with the use of the update tree catalog information. In this case, when the control unit 11 acquires the link information indicative of the page information to be subsequently read from the node page information, the control unit 11 determines whether the root link information of the update tree associated with the index of the page information to be subsequently read is stored in the storage unit 12, or not. This determination can be conducted, for example, on the basis of the file name of the root link information of the update tree. In this case, the control unit 11 reads the root link information of the update tree when the control unit 11 determines that the root link information of the update tree is stored. Then, the control unit 11 reads the page information indicated by the root link information of the read update tree from the storage unit 12. On the other hand, if the control unit 11 determines that the root link information of the update tree is not stored, the control unit 11 reads, from the storage unit 12, the page information indicated by the link information acquired from the node page information. Other processing is identical with that when the stable tree catalog information is used.

The center server SA may execute search using the stable tree catalog information and search using the update tree catalog information at the same time, for example, through the selecting operation by the operator, or automatically. In this case, the search result of any one of the stable tree catalog information and the update tree catalog information in which the search is early finished can be displayed. For that reason, the search result can be rapidly obtained.

The center server SA conducts the search with the use of the first stable tree catalog information. As a result, if an appropriate record cannot be found, the center server SA may conduct the search with the use of the update tree catalog information. The node Nn may search the record with the use of the update tree catalog information. In this case, if the node Nn does not save necessary page information while searching the record with the use of the update tree catalog information, the node Nn transmits the update tree page request message to another node Nn or the center server. When the control unit 11 of the center server SA receives the update tree page request message, the control unit 11 searches the page information of the update tree to which the same index as the request index set in the received page request message is allocated. Then, the control unit 11 transmits the update tree page transmission message including the searched page information to the node Nn that is a source of the page request message. In this situation, the control unit 11 set "pull type" as the transmission type.

The center server SA may deliver the page information created by updating, adding, or deleting the record, and the page information created through the update tree merging process after delivering the root link information of the new stable tree created through the update tree merging process to each node Nn. In this case, the center server SA delivers the page information with the use of the stable tree page transmission message.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

What is claimed is:

1. An information generating device in an information communication system in which a plurality of contents and catalog information including a plurality of attribute information of the contents are distributed and saved in a plurality of node devices connected to a network, the information generating device comprising:
   memory storing:
      first catalog information that is distributed and saved in the plurality of node devices, the first catalog information including link information associating the plurality of attribute information with each other under a given rule; and
      computer readable instructions, and
   a processor that is configured to execute the computer readable instructions to:
      acquire, in response to updating the content of the attribute information included in the first catalog information, the updated attribute information;
      generate the link information to be used for updating the first catalog information on the basis of the acquired attribute information, and the first catalog information stored in the memory, and generate second catalog information including the generated link information and the updated attribute information;
      store in the memory the generated second catalog information; and
      update the first catalog information stored in the memory on the basis of the second catalog information stored in the memory.

2. The information generating device according to claim 1, wherein the memory stores the first catalog information including the link information with check information for checking falsification of the attribute information, and
   wherein the link information including the check information for checking the falsification of the acquired attribute information is generated.

3. The information generating device according to claim 2, wherein the memory stores, as the first catalog information, plural pieces of page information including:
   root page information including the link information associating the root page information located at a root in a tree structure with child page information located at a child of the root page information, the link information including the check the information for checking falsification of the child page information,
   node page information including the link information associating the node page information located between the root page information and leaf page information located at a leaf with the child page information located at the child of the node page information, the link information including the check information for checking the falsification of the child page information, and
   the leaf page information including the attribute information,
wherein the processor further executes the computer readable instructions stored in the memory to:
   generate the leaf page information including the updated attribute information on the basis of the acquired attribute information,
   generate the page information including parent page information of a parent of the generated page information to the root page information on the basis of the generated page information and the page information stored in the memory, the link information including the check information for checking the falsification of the generated child page information being generated, and the parent page information including the generated check information being generated as the parent page information located at the parent of the child page information, and store in the memory the generated page information as the second catalog information, and wherein the first catalog information stored in the memory is updated by using the page information stored in the memory.

4. The information generating device according to claim 3, wherein the processor further executes the computer readable instructions stored in the memory to:

store in the memory first root link information included in the first catalog information, the first root link information including the check information for checking the falsification of the root page information and an electronic signature for checking the falsification of the first root link information;

generate the page information including the parent page information of the parent of the generated page information to the root page information, and generates second root link information including an electronic signature for checking the falsification of root link information and the check information for checking the falsification of the generated root page information;

store in the memory the generated second root link information as information included in the second catalog information, and allow the second root link information stored in the memory to be stored as the first root link information.

5. The information generating device according to claim 1, wherein the processor further executes the instructions stored in the memory to:

acquire assigned information indicative of the node device which is assigned to save the attribute information included in the second catalog information stored in the memory;

transmit, to at least one of the plurality of node devices, first instruction information which instructs the assigned node device to save the attribute information on the basis of the acquired assigned information, the first instruction information including the attribute information included in the second catalog information stored in the memory; and transmit, to the node devices, second instruction information that instructs each of the node devices to use the transmitted attribute information for searching, as the attribute information included in the first catalog information saved in the node devices.

6. The information generating device according to claim 1, wherein the processor further executes the instructions stored in the memory to:

acquire condition information indicative of a search condition of the content; and a search unit configured to search the attribute information that satisfies the search condition indicated by the acquired condition information by using the second catalog information stored in the memory.

7. An information generating method in an information communication system in which a plurality of contents and catalog information including a plurality of attribute information of the contents are distributed and saved in a plurality of node devices connected to a network, the information generating method comprising:

storing first catalog information that is distributed and saved in the plurality of node devices, the first catalog information including link information associating the plurality of attribute information with each other under a given rule;

acquiring, in response to updating the content of the attribute information included in the first catalog information, the updated attribute information;

generating the link information to be used for updating the first catalog information on the basis of the acquired attribute information and the stored first catalog information;

generating second catalog information including the generated link information and the updated attribute information;

storing the second catalog information generated in the generating in a memory; and updating the stored first catalog information on the basis of the stored second catalog information.

8. A non-transitory computer readable storage medium, the storage medium storing an information generating program executable by the computer included in an information generating device in an information communication system in which a plurality of contents and catalog information including a plurality of attribute information of the contents are distributed and saved in a plurality of node devices connected to a network, the storage medium including instructions for:

storing first catalog information that is distributed and saved in the plurality of node devices, the first catalog information including link information associating the plurality of attribute information with each other under a given rule;

acquiring, in response to updating the content of the attribute information included in the first catalog information, the updated attribute information;

generating the link information to be used for updating the first catalog information on the basis of the acquired attribute information and the stored first catalog information;

generating second catalog information including the generated link information and the updated attribute information;

storing the second catalog information generated in the generating in a memory; and updating the stored first catalog information on the basis of the stored second catalog information.

\* \* \* \* \*